United States Patent
Mercier et al.

(10) Patent No.: US 12,459,235 B2
(45) Date of Patent: Nov. 4, 2025

(54) ASYMMETRIC LAMINATED GLAZING

(71) Applicant: SAINT-GOBAIN GLASS FRANCE, Courbevoie (FR)

(72) Inventors: Gérald Mercier, Compiegne (FR); Jean-Philippe Boure, Ribecourt (FR); Simon Defreitas, Paris (FR); Thibault Rapenne, Noyon (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 427 days.

(21) Appl. No.: 17/909,202

(22) PCT Filed: Mar. 11, 2021

(86) PCT No.: PCT/EP2021/056129
§ 371 (c)(1),
(2) Date: Sep. 2, 2022

(87) PCT Pub. No.: WO2021/180828
PCT Pub. Date: Sep. 16, 2021

(65) Prior Publication Data
US 2023/0093696 A1    Mar. 23, 2023

(30) Foreign Application Priority Data

Mar. 12, 2020 (FR) ...................... 2002440

(51) Int. Cl.
B32B 17/10 (2006.01)
(52) U.S. Cl.
CPC .. B32B 17/10036 (2013.01); B32B 17/10091 (2013.01); B32B 17/10119 (2013.01);
(Continued)

(58) Field of Classification Search
CPC ........ B32B 17/10036; B32B 17/10091; B32B 17/10119; B32B 17/10339;
(Continued)

(56) References Cited

U.S. PATENT DOCUMENTS 5,849,402 A   12/1998 Kraemling et al.
5,972,513 A   10/1999 Yoshizawa
(Continued)

FOREIGN PATENT DOCUMENTS

FR    3012073 A1 *  4/2015   ....... B32B 17/10036
JP    2015-516934 A    6/2015
(Continued)

OTHER PUBLICATIONS

International Search Report as issued in International Patent Application No. PCT/EP2021/056129, dated May 10, 2021.
(Continued)

*Primary Examiner* — Megha M Gaitonde
(74) *Attorney, Agent, or Firm* — Pillsbury Winthrop Shaw Pittman LLP

(57) ABSTRACT

A formed laminated glazing for a vehicle, includes two sheets of glass of different thicknesses separated by an interlayer made of polymer material, the thickness E1 of the thick glass V1 being such that 1.4 mm≤E1≤3.9 mm, the thickness E2 of the thin glass V2 being such that 1.1 mm≤E2≤2.6 mm, the thickness E3 of the polymer material M being such that 0.3 mm≤E3≤1.2 mm, the total glass thickness EV being such that 2.5 mm≤EV≤5.7 mm, the ratio of the thicknesses E2/E1 being such that 0.34≤E2/E1≤0.9. This glazing combines rigidity, acoustic performance and ease of manufacture.

21 Claims, 5 Drawing Sheets

(52) U.S. Cl.
CPC .. *B32B 17/10339* (2013.01); *B32B 17/10761* (2013.01); *B32B 2307/102* (2013.01); *B32B 2307/402* (2013.01); *B32B 2307/732* (2013.01); *B32B 2605/006* (2013.01)

(58) Field of Classification Search
CPC ........ B32B 17/10761; B32B 2307/102; B32B 2307/402; B32B 2307/732; B32B 2605/006; B32B 7/02; B32B 17/1055; B32B 17/10807; B32B 17/10981; B32B 27/306; B32B 2307/30; B32B 17/10899; B32B 2309/105; B32B 3/263; B32B 17/10568; B32B 17/10779; B32B 17/10587; B32B 27/22; B32B 27/30; B32B 27/08; B32B 2315/08; B32B 2329/06; B32B 2605/08; C08J 5/18; C08J 2329/14; G02B 2027/012; G02B 27/01; B60J 1/001; B60J 1/02; B60K 2370/1529; Y10T 428/24479; Y10T 428/24612; Y10T 428/24942; Y10T 428/2495; Y10T 428/24959
USPC ....... 428/156, 172, 174, 179, 212, 213, 214, 428/215, 220
See application file for complete search history.

(56) References Cited

U.S. PATENT DOCUMENTS

| | | | |
|---|---|---|---|
| 2012/0055094 A1 | 3/2012 | Iacovoni et al. | |
| 2015/0202854 A1 | 7/2015 | Tsuchiya et al. | |
| 2016/0250982 A1* | 9/2016 | Fisher | B32B 17/06 428/215 |
| 2017/0050415 A1* | 2/2017 | Kanki | B32B 17/10633 |
| 2018/0250918 A1 | 9/2018 | Schall et al. | |
| 2020/0207064 A1* | 7/2020 | Ulizio | B32B 17/10761 |
| 2021/0370646 A1* | 12/2021 | Gy | B32B 17/10807 |

FOREIGN PATENT DOCUMENTS

| | | |
|---|---|---|
| JP | 2019-505466 A | 2/2019 |
| JP | 2019-513094 A | 5/2019 |
| JP | 2019-532898 A | 11/2019 |
| JP | 2020-506140 A | 2/2020 |
| WO | WO 02/06170 A1 | 1/2002 |
| WO | WO 2004/033381 A1 | 4/2004 |
| WO | WO 2005/047198 A1 | 5/2005 |
| WO | WO 2013/134599 A1 | 9/2013 |
| WO | WO 2014/054468 A1 | 4/2014 |
| WO | WO 2017/151345 A1 | 9/2017 |
| WO | WO 2017/178733 A1 | 10/2017 |
| WO | WO 2018/015702 A1 | 1/2018 |
| WO | WO 2018/075289 A1 | 4/2018 |
| WO | WO 2018/136860 A1 | 7/2018 |
| WO | WO 2019/006150 A1 | 1/2019 |
| WO | WO 2020/020937 A1 | 1/2020 |
| WO | WO2020020937 * | 1/2020 |

OTHER PUBLICATIONS

Second Office Action as issued in Chinese Patent Application No. 202180002640.4, dated Mar. 2, 2023.

Pang, S.-H., et al., "Investigation on the Bending Behavior and Effective Thickness of Laminated Glass," Bulletin of the Chinese Ceramic Society, vol. 28, No. 3, Jun. 2009, pp. 599-604.

First Office Action as issued in Chinese Patent Application No. 202180002640.4, dated Sep. 1, 2022.

* cited by examiner

[Fig.1]
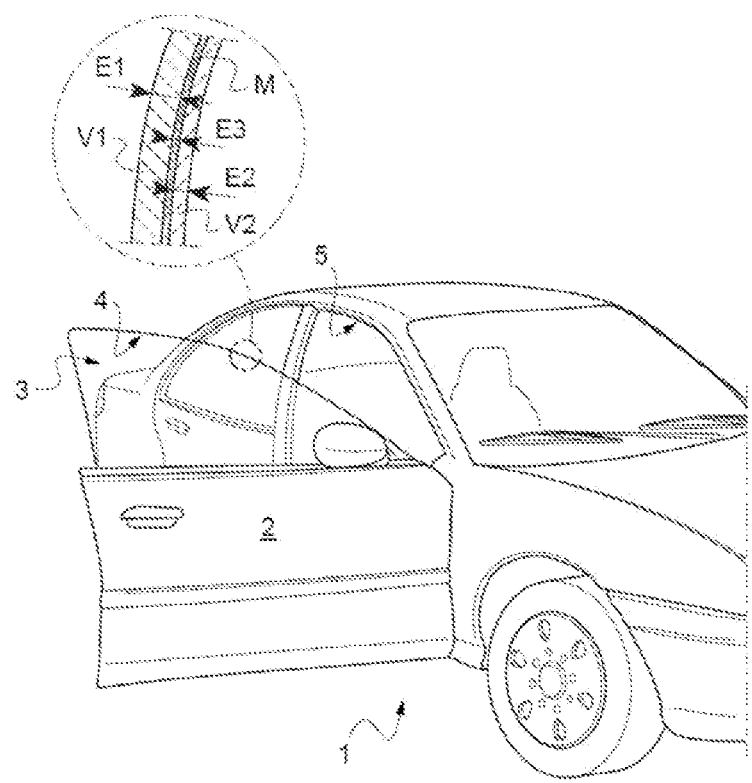
[Fig. 2]
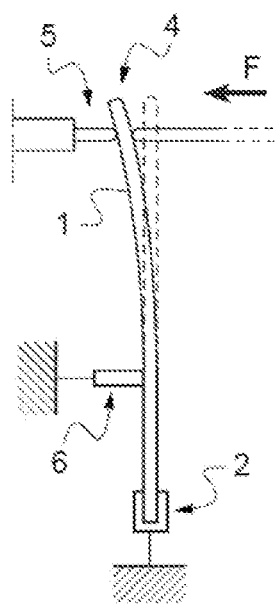

ASYMMETRIC LAMINATED GLAZING

CROSS-REFERENCE TO RELATED APPLICATIONS

This application is the U.S. National Stage of PCT/EP2021/056129, filed Mar. 11, 2021, which in turn claims priority to French patent application number 2002440 filed Mar. 12, 2020. The content of these applications are incorporated herein by reference in their entireties.

TECHNICAL FIELD

The invention relates to the field of laminated glazings for vehicles, particularly motor vehicles, particularly side glazings, i.e. the glazings which equip motor vehicle doors and which can be raised or lowered in the door.

TECHNICAL BACKGROUND

Conventionally, motor vehicle side glazings are monolithic and tempered. In order to improve resistance to break-ins, these side glazings can advantageously be laminated. In order for them to retain a good resistance to external impacts (particularly in the case of a break-in and optionally when hit by stones) or internal impacts (laminated side windows make it possible to keep occupants inside the passenger compartment in the event of an accident and of the vehicle rolling over; thus, they prevent permanent injury when an occupant is partially thrown from the vehicle), the sheets of glass composing the laminated glazing are toughened, i.e. tempered or semi-tempered. It has already been proposed to produce a laminated glazing by assembling a very thin sheet of glass, of a thickness of less than 1 mm, where appropriate cold formed, with a thick sheet of glass. However, the very fine thickness of the thin sheet makes it necessary to resort to chemical tempering, which is an expensive technique, as a hardening treatment. Moreover, it is sought to produce windows which are as light as possible in terms of weight, and the thickness of which does not exceed that of standard monolithic windows. Moreover, since these laminated side windows are more particularly intended to equip luxury vehicles, they are expected to have acoustic insulation properties and the ability to be mounted in "frameless" doors, i.e. those without an upper frame. In this case, the glazing must be sufficiently rigid for the upper edge thereof to correctly engage in the groove provided for this purpose in the vehicle body at the upper part of the door opening, when the window is raised.

Indeed, it has been observed that, when the vehicle is moving at high speed, it could be difficult to completely raise an insufficiently rigid window due to a pressure differential between the inside and outside of the vehicle, causing substantial deformation of this window.

SUMMARY OF THE INVENTION

The invention solves the aforementioned problems and makes it possible, at a reasonable cost, to obtain a laminated glazing having an exceptional compromise of properties. The invention stems from the desire to use sheets of glass that are thick enough to be reinforced thermally without having to use chemical tempering. To this end, and in the current state of the art, it is considered that these sheets must have a thickness of at least 1 mm.

For an equal thickness of glass, a laminated glazing has a flexural rigidity modulus which is less than that of a monolithic glazing. Indeed, according to mechanical plate theory, the flexural rigidity modulus R (reflecting the ability to withstand applied flexural forces) of a sheet of glass is proportional to the cube of its thickness T, according to the formula:

$$R = K(E, \mu) \cdot T^3$$

wherein K is a coefficient of proportionality depending on the elastic modulus E of the material and on the Poisson's coefficient, $\mu$, thereof. This is why, when comparing the flexural rigidity $R_m$ of a monolithic glass with a thickness of between 2.85 and 4.85 mm and the flexural rigidity $R_f$ of a laminate of two glasses, the individual thicknesses of which are between 1.6 mm and 2.6 mm, it is observed that the rigidity of the monolithic glass is much greater:

$$R_m = K \cdot (2.85 \text{ to } 4.85)^3 >> R_f = K \cdot [(1.6 \text{ to } 2.6)^3 + (1.6 \text{ to } 2.6)^3]$$

It should be noted that, in the formula for Rf above, the contribution of the thermoplastic interlayer which, for temperatures higher than $-10°$ C. is always highly negligible, has been removed.

According to the invention, an asymmetric glazing is produced, which means that it comprises two sheets of glass of different thicknesses, one sheet of glass V1 of thickness E1, and one sheet of glass V2 of thickness E2, E1 being greater than E2, V1 being referred to as thick glass and V2 being referred to as thin glass. Generally, the thin glass is placed on the interior side of the vehicle and can be referred to as "interior glass". The outer face thereof, facing the interior of the vehicle, is generally concave in a vertical direction. Generally, the thick glass is placed on the exterior side of the vehicle and can be referred to as "exterior glass". The outer face thereof, facing the exterior of the vehicle, is generally convex in a vertical direction.

According to the invention, the asymmetry ratio is moderate, and is such that $0.34 \leq E2/E1 \leq 0.9$ and the thin glass is at least 1.1 mm thick. Indeed, the use of very thin sheets of glass is avoided given the following negative observations:
- very thin sheets of glass (i.e. less than 1 mm, typically 0.7 or 0.55 mm) are extremely fragile and cause numerous breakages and numerous steps in the process: cutting, treating, washing before or after shaping, optional chemical tempering, assembly, palletization, etc.;
- cold forming, which is possible with very thin sheets (i.e. less than 1 mm, typically 0.7 or 0.55 mm) has proved disappointing for two reasons: 1) a limitation on the geometric complexity which can be achieved with this technique since it affects the optical quality of the edges or the assemblability of the two sheets of glass— because the very thin interior sheet of glass tends to form folds at the periphery of the glazing, and 2) it is necessary to reinforce the mechanical properties of the interior sheet of glass by chemical tempering;
- the chemical tempering operation, which is necessary for reinforcing the very thin sheets, has proved not to be very well suited to the production of products for motor vehicles: 1) this operation is too long, since it requires maintaining the sheet of glass at a high temperature for several hours in different alkali metal salt baths in order to obtain the correct surface stress levels, 2) it gives rise to very mediocre yields with numerous breakages during the handling operations, the washing before or after chemical tempering, and during the tempering operation itself, 3) batchwise working, which by its nature is discontinuous and requires intermediate storage, is very disruptive in production workshops.

This is why the invention has been developed based on the following principles:
1) using sheets of glass of a thickness equal to or greater than 1.1 mm,
2) shaping the two sheets of glass in conventional hot forming methods (and not "cold" forming methods) and lamination methods, and
3) using a thermal reinforcement (and not a chemical reinforcement) by rapid cooling in air, in order to semi-temper or optionally temper each sheet of glass;
4) taking into account the thickness of the interlayer made of polymer material; indeed, it has been noted that the thicker the interlayer, the more it reduces the rigidity of the laminated glazing.

The expression hot forming denotes hot forming of the glass at its deformation temperature, causing the permanent deformation thereof after it returns to ambient temperature. This is therefore not cold forming which operates in the elastic domain of the glass. This hot forming is carried out at a temperature higher than the glass transition temperature of the glass and generally at a temperature higher than 550° C.

Thus, the invention firstly relates to a formed laminated glazing for a vehicle, comprising two sheets of glass of different thicknesses separated by an interlayer made of polymer material, characterized in that
the thickness $E1$ of the thick glass V1 is such that 1.4 mm≤$E1$≤3.9 mm,
the thickness $E2$ of the thin glass V2 is such that 1.1 mm≤$E2$≤2.6 mm,
the thickness $E3$ of the polymer material M is such that 0.3 mm≤$E3$≤1.2 mm,
the total glass thickness EV is such that 2.5 mm≤EV≤5.7 mm,
the ratio of the thicknesses $E2/E1$ is such that 0.34≤$E2/E1$≤0.9.

The polymer material, referred to as M, is generally of the PVB type (polyvinyl butyral). This polymer material may be of the "acoustic" type, i.e. having the function of reducing sounds passing through the glazing. In order to be classified as acoustic, such a polymer material must comprise at least one layer of polymer material (generally made of PVB) having a tan(δ) loss factor of greater than 0.8 and a shear modulus G' of less than 20 MPa at frequencies of between 500 Hz and 5000 Hz at the temperature of 20° C. These viscoelastic properties are evaluated by those skilled in the art by means of a measurement by planar shearing according to standard ISO 6721 (Determination of dynamic mechanical properties) using a viscosity analyzer such as Metravib 01 dB Metravib VA4000.

This layer of acoustic polymer material may be the only layer of the interlayer, or may be juxtaposed with at least one other layer of polymer material. An interlayer having acoustic properties may particularly be produced by assembling at least three layers of PVB, an interior layer being softer than two other layers surrounding it. Generally, an acoustic polymer material causes a laminated glazing to lose a small amount of rigidity compared to a conventional polymer material. A conventional polymer material is therefore better suited to a laminated glazing for which the main expectation is high rigidity. A conventional polymer material has a shear modulus G' of greater than 100 MPa and a tan(δ) loss factor of less than 0.4 at frequencies of between 500 Hz and 5000 Hz at the temperature of 20° C.

A laminated glazing is particularly provided having a good rigidity/acoustic compromise, with 0.45≤$E2/E1$≤0.62.

The more glass the laminated glazing comprises, the better its rigidity. This is why, advantageously, the total glass thickness EV (EV=$E1+E2$) in the laminated glazing is such that 3 mm≤EV≤5.7 mm, and preferably such that 3.5 mm≤EV≤5.7 mm (note that "x≤y" means "x is less than or equal to y" and that "x≥y" means "x is greater than or equal to y").

At a constant total glass thickness (constant EV), when the asymmetry increases, the rigidity also increases, due to the fact that the rigidity of glass increases with the cube of its thickness, as already explained above. This is why, if rigidity is a very important criterion, the following are advantageously combined:
$E2/E1$≤0.88 and preferably $E2/E1$≤0.74 and preferably $E2/E1$≤0.62, and
1.8 mm≤$E1$ and preferably 2.1 mm≤$E1$;
where appropriate in combination with the already mentioned preference for a total glass thickness that promotes rigidity, i.e. 3 mm≤EV≤5.7 mm, and even 3.5 mm≤EV≤5.7 mm, and where appropriate in combination with the use of a conventional polymer material (generally made of PVB) between V1 and V2.

In the context of this combination, it is also possible to place an acoustic polymer (generally comprising an acoustic PVB) between the two sheets of glass, if it is acceptable to lose a small amount of rigidity in the final glazing.

If acoustic performance of the laminated glazing is particularly sought, use is preferably made, as interlayer material, of an acoustic polymer material as described above, which, at equal thicknesses of V1, V2 and M, generally causes the laminated glazing to lose rigidity. In order to compensate for this loss of rigidity, it might have been considered desirable to greatly increase the thickness asymmetry of the two glasses. While this high asymmetry does indeed provide an increase in rigidity, it has also been observed, unexpectedly, that the acoustic performance properties were degraded. It was therefore ultimately determined that the asymmetry between the two glasses had to be present, but relatively moderate, so as to be able to obtain an excellent compromise of properties between acoustic performance and rigidity.

If acoustics is a very important criterion, the following are advantageously combined:
0.36≤$E2/E1$ and preferably 0.39≤$E2/E1$ and preferably 0.42≤$E2/E1$ and preferably 0.45≤$E2/E1$, and
1.4 mm≤$E2$ and preferably 1.6 mm≤$E2$,
where appropriate in combination with the already mentioned preference for a total glass thickness that promotes rigidity, i.e. 3 mm≤EV≤5.7 mm, and even 3.5 mm≤EV≤5.7 mm, and preferably in combination with the use of an interlayer comprising an acoustic polymer material, generally an acoustic PVB.

The two sheets of glass can have the same contour before forming. The sheets of glass are both formed into the same shape, i.e. the shape of the final glazing before being assembled as a laminated glazing. Suitable forming methods for the two sheets of glass are for example of the type "forming while conveying between two roller beds" (as in WO2005047198 or WO2004033381) or of the type "forming by pressing" (as in WO0206170 or WO2017178733). The sheets are preferably formed in the individual state and not in the superimposed state.

At least one sheet of glass can be made of a soda-lime or aluminosilicate or borosilicate glass. The two sheets of glass can be made of a soda-lime or aluminosilicate or borosilicate glass. The two sheets of glass may be of different types, for example one may be soda-lime while the other is aluminosilicate or borosilicate.

At least one of the sheets of glass may be tinted. The two sheets of glass may be tinted. A tinted glass is a glass comprising the desired inorganic pigment (iron oxide, cobalt oxide, chromium oxide, etc.). The two sheets of glass may particularly be of different composition and hue.

Generally, the sheets of glass are thermally reinforced, i.e. semi-tempered or tempered before assembling the laminated glazing. In the context of the present application, a surface stress is measured by an apparatus operating on the principle of polariscopy, such as the Scalp-04 polariscope sold by GlasStress Ltd, Tallin 10912 Estonia. The stress values given are absolute values, since those skilled in the art can also express them with a negative sign.

In the context of the present application, an edge stress is measured by photoelasticimetry using the apparatus Sharples Edge Stress Meter Ref (S-67) from Sharples Stress Engineers LTD, Preston United Kingdom.

A thermally tempered glass leads to a surface stress of greater than 90 MPa, generally between 90 and 200 MPa. A thermally toughened (or semi-tempered) glass has a surface stress within the range extending from 15 to 90 MPa, more generally in the range extending from 20 to 60 MPa.

The glazing according to the invention may be a motor vehicle glazing, particularly for frameless doors.

The manufacture of a semi-tempered glass (also referred to as "thermally toughened") is carried out on an installation which is identical to that of thermally tempered glass. The heating conditions are identical, but the blowing power of the cooling air is lower, which reduces the convective heat exchanges with the main faces of the glass. As a result, the cycle time is higher since more time is required for the cooling to fix the residual stresses in the glass.

The invention also relates to a method for manufacturing a glazing according to the invention, comprising
hot forming followed by thermal reinforcement by blowing air for the two sheets of glass;
assembling the two sheets of glass into a laminated glazing, one sheet of polymer material being placed between the two sheets of glass and adhering to them.

The hot forming of the sheets can be carried out on each sheet of glass in the individual state. The two sheets of glass are preferably formed into identical shapes, with a difference in shape being possible as long as it remains within the tolerance range for the manufacturing method set to obtain identical shapes. The two sheets are preferably formed by the same forming method. Indeed, the same type of method affords the advantage of giving the most similar shapes possible to different sheets, even if they are of different thickness. Identical method is intended to mean that the two sheets of glass are both formed using the same principle, i.e. both by pressing, or both by gravity, or both by shaping by conveying between roller beds. Even if the two sheets of glass are formed by the same type of forming method, each may be formed during a different run from the one during which the other sheet is formed.

In the cases in which each sheet of glass (exterior glass and interior glass) is shaped in the individual state (i.e. not in the stacked state), it is advantageous to circulate them through the furnace and to shape them one immediately after the other. Indeed, this makes it possible to continuously feed the assembly process straight after the shaping step. Nonetheless, when the two sheets of glass are too different from one another, for example in terms of color and/or thickness, it may be difficult to ensure similar geometry for the two types of sheets of glass if they are shaped one immediately after the other during the same production run. Indeed, and by way of example, a thin and heavily tinted sheet of glass will heat up more rapidly than a clear and thick sheet of glass. If these two sheets of glass follow one another in the same production, it is highly probable that the forming results in two families with significantly different geometries (one corresponding to the thin tinted glass and the other corresponding to the thick clear glass).

Thus, if the two sheets of glass are too different from one another, it is preferable to shape them in batches. It is thus possible to form a first batch of sheets of glass (corresponding for example to the exterior glass) then, during a second run, to shape a second batch of sheets of glass (corresponding to the interior glass). The assembly operation, combining sheets from two discrete shaping runs, can then be carried out simultaneously to the second shaping run. It is thus possible to carry out the hot forming on the two sheets of glass in the individual state and by the same type of method for these two sheets and during two separate production runs for each of these sheets of glass.

Preferably, at least one sheet of glass is thermally reinforced and preferably the two sheets of glass are thermally reinforced. The thermal reinforcement is carried out straight after the forming by rapidly cooling the glass by blowing air over both faces thereof, starting from the forming temperature.

The assembly of the laminated glazing starting from the sheets of glass and the interlayer can be carried out according to methods known to those skilled in the art, generally requiring autoclaving.

BRIEF DESCRIPTION OF THE FIGURES

FIG. 1 is a perspective view which partially shows a motor vehicle, one door of which is open and which illustrates the example of a "frameless" door;

FIG. 2 is a schematic depiction which shows the technique used for measuring the rigidity of a monolithic or laminated glass;

DETAILED DESCRIPTION

Figure 3:
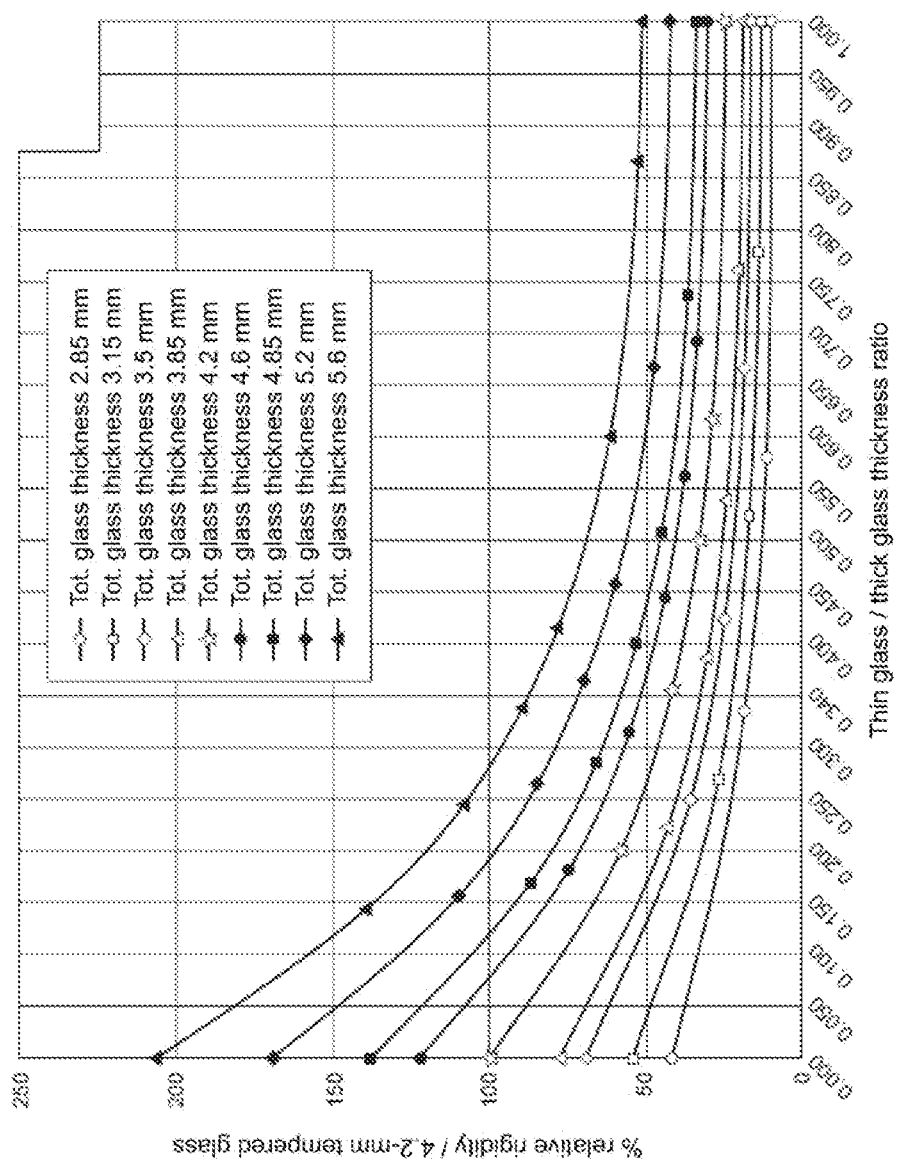
FIG. 3 shows a graph of the changes in the rigidity of laminated glazings relative to the rigidity of a monolithic glazing 4.2 mm thick, with this being based on the thickness ratio of the two sheets of glass contained in said laminated glazing.

FIG. 1 shows a motor vehicle 1, one door 2 of which is open. This door comprises a "frameless" window 3, i.e. the door does not frame it in its upper part. It is important for this window to be rigid enough for the upper edge 4 thereof to correctly engage in the groove 5 of the vehicle body when said window is completely raised. The structure of the window 3 is in accordance with the invention and is shown in the magnified portion. This is a laminated glazing comprising a sheet of glass V1 of thickness E1 and a sheet of glass V2 of thickness E2, these two sheets being adhesively assembled on either side of a sheet M of polymer material of thickness E3, with E1>E2. The thicker sheet V1 is outside the vehicle and the thinner sheet V2 is inside the vehicle.

The concave face of the glazing is inside the vehicle.

FIG. 2 shows the technique used in the context of the present application for measuring the rigidity of a monolithic or laminated glass. A rectangular glazing 1 (laminated or monolithic) of similar dimensions to those of a door glazing is fixedly held by one edge 2 and a known flexural force F is applied to the edge 4 opposite that of the fixing. A fixed bar 6 holds the bottom of the glazing in position. A sensor 5 measures the displacement caused by the force F. The ratio of the force to the displacement is considered to be a measure of rigidity. Given that, for equal glass thickness, when the asymmetric nature increases, the rigidity increases, a symmetric glazing with a constant total glass thickness is used as reference. In the following examples, relative rigidity values are given. This way of measuring rigidity can be simulated using a numerical finite element model, taking into account the contribution of the polymer interlayer based on the temperature, and the results have been correlated with experience. These simulations were used to establish the curves of FIGS. 3 and 5. It should be noted that, for these simulations, an acoustic PVB 0.81 mm thick from the brand Sekisui, reference RZN 12 SAF, was considered, which meets the requirements indicated above for acoustic PVBs, at a temperature of 20° C. Of course, a representative number of points were used to verify that the simulations did indeed reflect reality.

FIG. 3 shows a graph of the changes in the rigidity of laminated glazings relative to the rigidity of a monolithic glazing 4.2 mm thick, with this being based on the thickness ratio of the two sheets of glass contained in said laminated glazing. Each curve is at the same total glass thickness, the latter varying from 2.85 to 5.6 mm. The points on the y-axis (at ratio 0) therefore correspond to a monolithic glazing and those at ratio 1 correspond to a symmetric laminated glazing (the two sheets of glass having the same thickness). It can be seen that all the curves display the same tendency, namely that the monolithic glass has a rigidity which is much greater than any laminated glass containing as much glass, and moreover, for a laminated glass, the more the ratio of the thicknesses of the sheets approaches 1 (for a constant amount of glass), the more the rigidity decreases.

Figure 4:
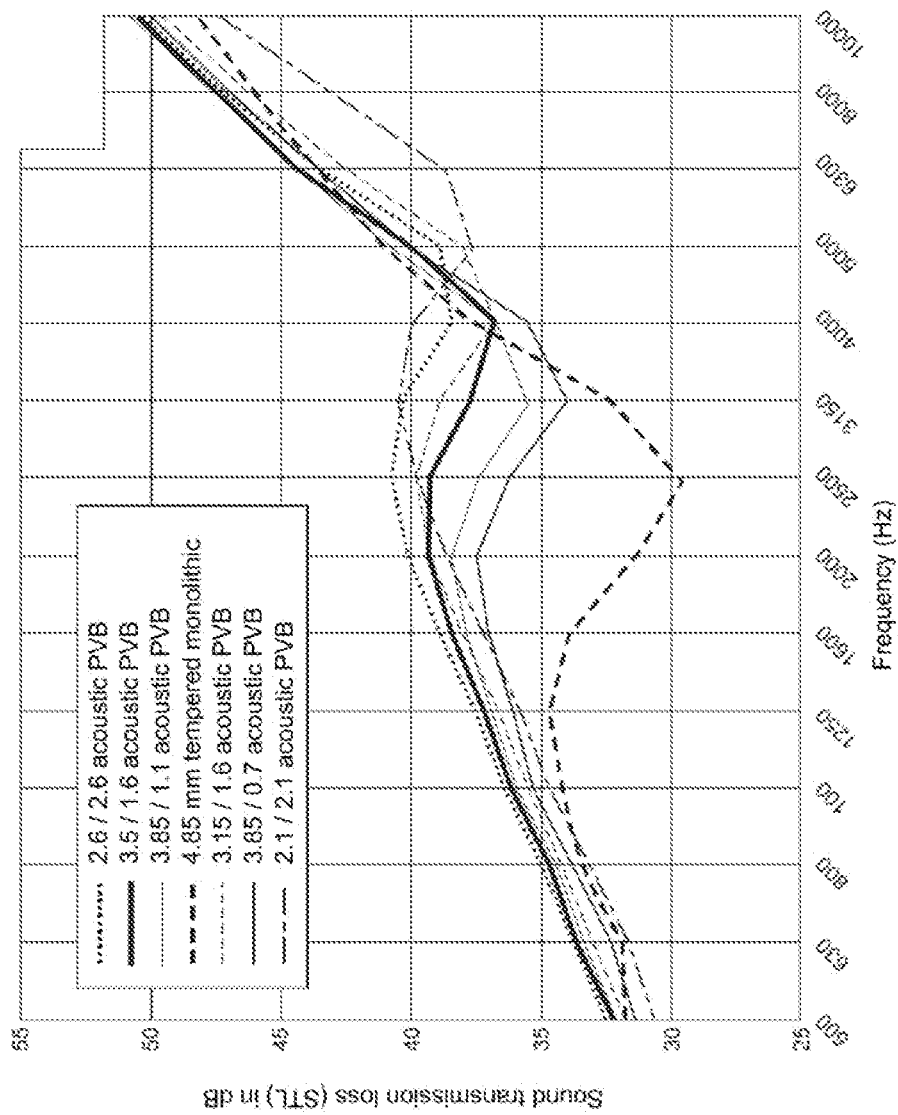
FIG. 4 shows the sound transmission loss (or STL) based on the frequency thereof for different glazings comprising an acoustic PVB 0.81 mm thick.

FIG. 4 shows the sound transmission loss (STL) based on the frequency thereof for different glazings comprising an acoustic PVB 0.81 mm thick, from the brand Sekisui, reference RZN 12 SAF, which meets the requirements indicated above for acoustic PVBs. The sound transmission losses were determined from measurements carried out according to standard EN ISO 10140 on glazings of dimensions 500 mm×800 mm at the temperature of 20° C. (+/−3° C.). By way of comparison, the same measurements were carried out on a tempered glass 4.85 mm thick. A particularly important range of frequencies is the range from 2000-5000 Hz, for two reasons. First of all, this is the range of frequencies at which the human ear has maximum sensitivity. Moreover, the critical frequency for those skilled in the art for this type of glazing with a total glass thickness of 2.5 to 6 mm is located in this frequency range of 2000-5000 Hz due to the presence of a minimum acoustic attenuation. Thereby, for linguistic simplicity, this range of frequencies is referred to as "range of critical frequencies". This is all the more important since, in the case of motor vehicle doors, the ears of the vehicle passengers are located in the direct vicinity of the side glazing and therefore of their acoustic dispersion, associated with acoustic excitations in this range of frequencies, for example turbulence associated with the rear-view mirrors.

Analysis of the different curves in this spectral range demonstrates the presence of coincidence frequencies for the different glazings, having a disadvantageous impact on the sound transmission loss. The composition having the best level of sound transmission loss over the 2 kHz-5 kHz band corresponds to the 2.6/2.6 mm symmetric glazing. Tempered glass gives the lowest sound transmission loss, marked by a coincidence frequency at 2500 Hz. Under the conditions of these tests, the sound attenuation in the range of critical frequencies has a difference of the order of +9 dB in favor of the symmetric laminated glazing compared to the tempered monolithic glass, for a similar total amount of glass (less than 10% difference). Pursuing this analysis, for asymmetric laminated glazings with a similar total amount of glass, there is a difference in favor of the symmetric laminated glazing of +2 dB and +3.5 dB compared to glazings having a thickness ratio between interior glass and exterior glass E2/E1 equal to 0.46 and 0.29, respectively.

Figure 5:
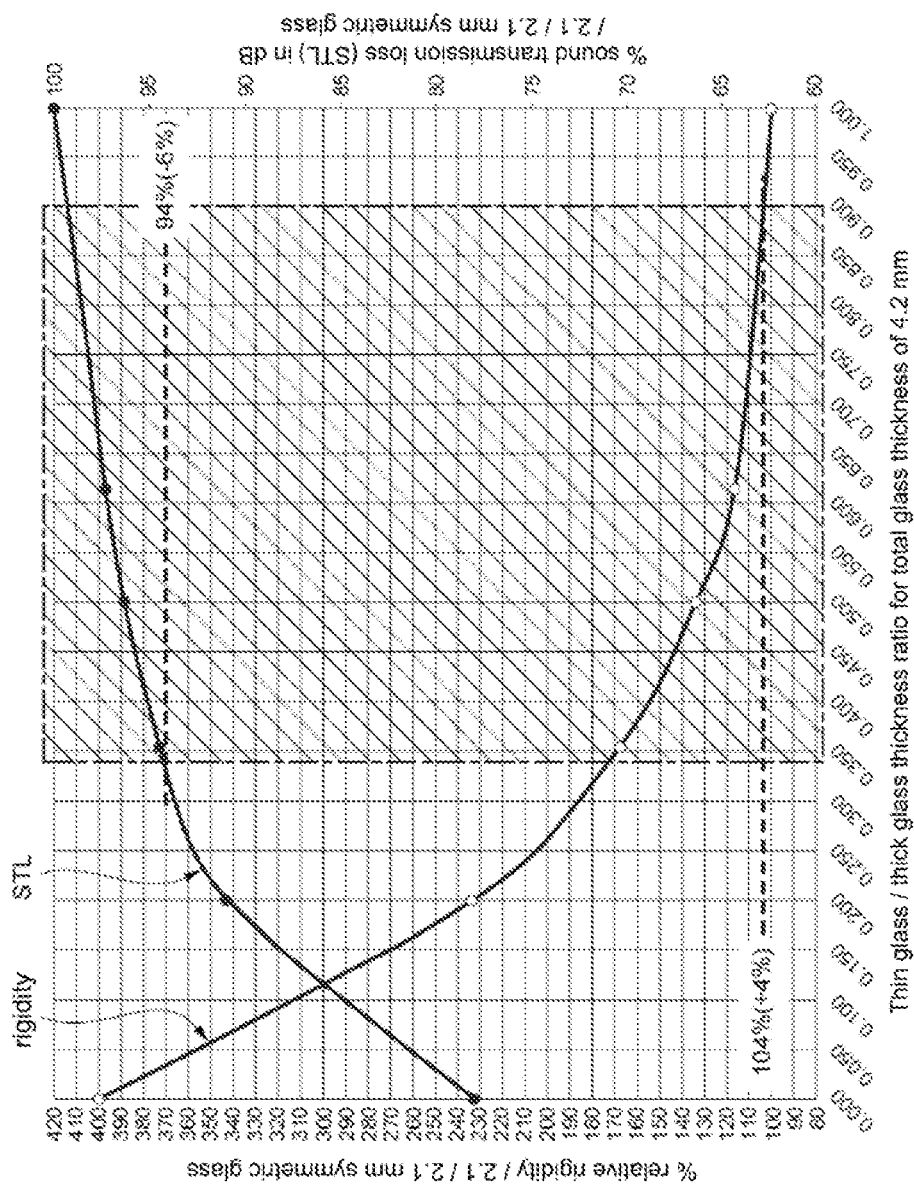
FIG. 5 shows the changes in relative rigidity (descending curve) and in the minimum relative acoustic attenuation (ascending curve) based on the thickness ratio of the two sheets in a laminated glazing equipped with the same acoustic PVB as that in FIGS. 3 and 4 and under the same temperature conditions (namely 20° C.), each curve being at the same total glass thickness, i.e. 4.2 mm.

FIG. 5 shows the changes in relative rigidity (descending curve) and in the minimum relative acoustic attenuation (ascending curve) based on the thickness ratio of the two sheets in a laminated glazing equipped with the same acoustic PVB as that mentioned for FIGS. 3 and 4 and under the same temperature conditions (namely 20° C.), each curve being at the same total glass thickness, i.e. 4.2 mm.

Regarding the rigidity values, the reference taken into account is the 2.1/2.1 mm laminated glazing. In the figure, for each thickness ratio point, the percentage intrinsic rigidity of each simulation was plotted relative to the rigidity of the reference glazing previously defined.

The acoustic values were determined by taking the minimum STL at the critical frequency (or first coincidence frequency in the band from 2000 to 5000 Hz defined previously as illustrated by FIG. 4), for each thickness ratio and for the same total glass thickness (4.2 mm). The relative changes in the minimum STL in the critical frequency zone was then determined relative to the same references as for the rigidity curve (2.1/2.1 mm symmetric laminate). To this end, for each thickness ratio considered, each of these values (minimum STL) was subtracted from the corresponding value for the reference glazing, the result then being divided by the value for the reference glazing, the whole then being turned into a percentage by multiplying by 100. It can be considered that the range of thickness ratios from 0.34 to 0.9 makes it possible to obtain laminated glazings having an excellent compromise of acoustic and rigidity properties.

These curves of FIG. 5 therefore show that there is a range of thickness ratios within which the rigidity of a glazing is increased by at least +4% (i.e. 104% of the reference) of that of a symmetric glazing of equal total glass thickness, while retaining a minimum sound loss of at least 94% of that of the symmetric laminated glazing for an equal total glass thickness. These values are chosen in relation to the known uses of motor vehicle glazings, and correspond to the threshold of perception by the user of a vehicle. For example, in the case of the acoustic performance, a 2.1/2.1 mm symmetric laminated glazing comprising an acoustic PVB (defined above) 0.81 mm thick has a minimum STL in the 2-5 kHz critical frequency zone of the order of 38 dB. Thus, a −6% change (100-94%) corresponds to a reduction in the minimum STL of the order of 3 dB, rounding up to the nearest whole number, while those skilled in the art consider the threshold of perception of the human ear to be 3 dB.

Figure 6:
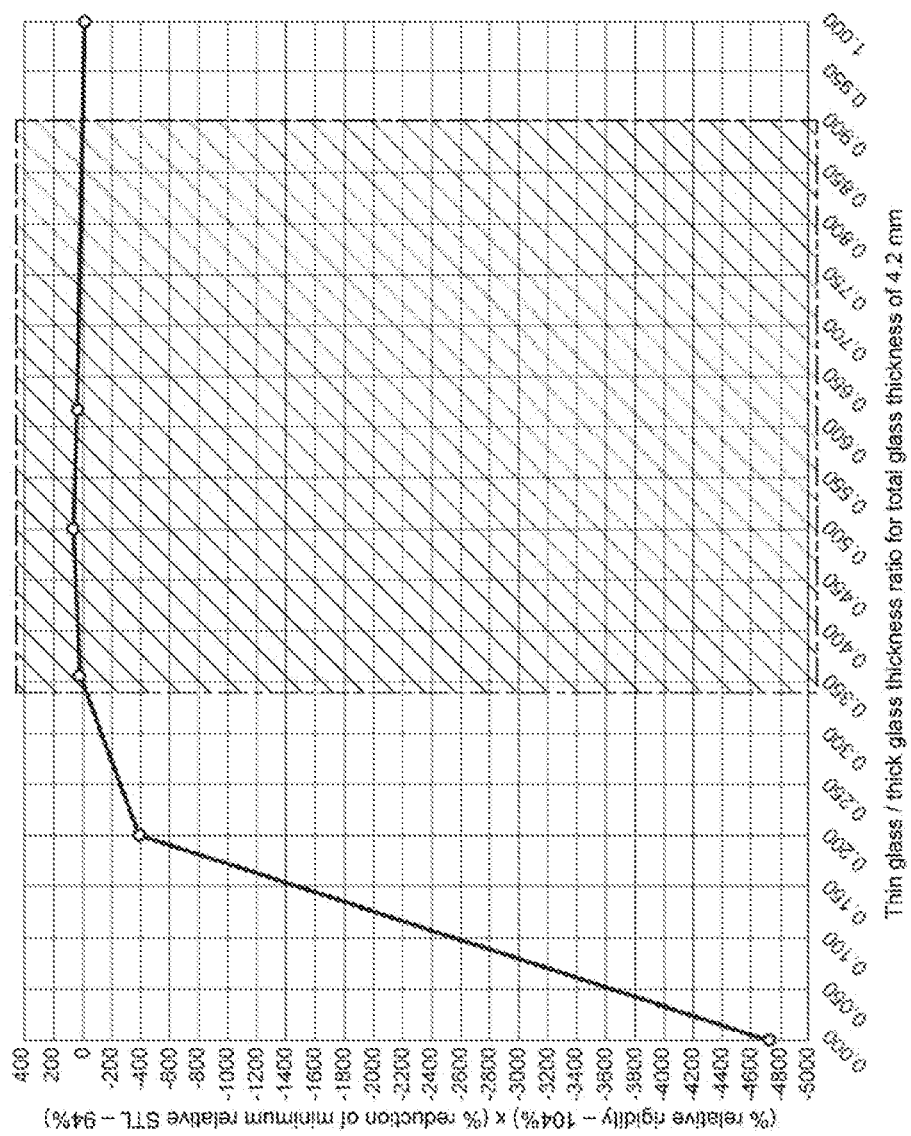
FIG. 6 graphically shows the changes in the product (in the sense of a multiplication):(relative rigidity −104%)× (relative decrease in minimum STL −94%) based on the thickness ratio of the two sheets of glass, for the same total glass thickness, i.e. in the example 4.2 mm.

With this having been defined, FIG. 6 graphically shows the changes in the product (in the sense of a multiplication): (relative rigidity −104%)×(relative decrease in minimum STL −94%) based on the thickness ratio of the two sheets of glass, for the same total glass thickness, i.e. in the example 4.2 mm. Seeking combinations of glass which enable both good rigidity and minimal degradation of the minimum STL in the critical frequency zone, for the same total glass thickness, it is preferable to seek asymmetric laminated glazings which make it possible to obtain the product defined above as a positive. For FIG. 6 (total glass thickness=4.2 mm), this range is that of the thickness ratio between the glasses ranging from 0.34 to 0.9. In every case, a good rigidity/acoustics compromise exists for a thickness ratio within the range extending from 0.45 to 0.62. The existence of a maximum is observed, demonstrating the existence of a compromise which optimizes the acoustics and rigidity performance properties at the same time. In this example of FIG. 6, the optimum ratio of the thicknesses of the two sheets of glass is 0.5.

The invention claimed is:

1. A formed laminated glazing for a vehicle, comprising two sheets of glass of different thicknesses that form a thick glass sheet and a thin glass sheet separated by an interlayer made of polymer material, wherein
   a thickness E1 of the thick glass sheet is such that 1.4 mm≤E1≤3.9 mm,
   a thickness E2 of the thin glass sheet is such that 1.1 mm≤E2≤2.6 mm,
   a thickness E3 of the polymer material M is such that 0.3 mm≤E3≤1.2 mm,
   a total glass thickness EV is such that 2.5 mm≤EV≤5.7 mm,
   a ratio of the thicknesses E2/E1 is from 0.45 to 0.62, thereby providing a balance of rigidity and sound insulation characterized by:
      (i) rigidity at least 104% of that of a symmetric laminated glazing of equal total glass thickness, and
      (ii) a minimum sound transmission loss (STL) at least 94% of that of the symmetric laminated glazing, measured in a 2000-5000 Hz range.

2. The glazing according to claim 1, wherein the total glass thickness EV is such that 3 mm≤EV≤5.7 mm.

3. The glazing according to claim 2, wherein the total glass thickness EV is such that 3.5 mm<EV<5.7 mm.

4. The glazing according to claim 1, wherein the polymer material comprises a PVB having a tan(δ) loss factor of greater than 0.8 and a shear modulus G' of less than 20 MPa at frequencies of between 500 Hz and 5000 Hz at the temperature of 20° C., referred to as acoustic PVB.

5. The glazing according to claim 4, wherein 1.4 mm≤E2.

6. The glazing according to claim 5, wherein 1.6 mm≤E2.

7. The glazing according to claim 5, wherein 0.45<E2/E1.

8. The glazing according to claim 1, wherein 1.8 mm≤E1.

9. The glazing according to claim 8, wherein 2.1 mm≤E1.

10. The glazing according to claim 8, wherein E2/E1<0.62.

11. The glazing according to claim 1, wherein 0.45<E2/E1<0.62.

12. The glazing according to claim 1, wherein at least one sheet of glass is thermally reinforced.

13. The glazing according to claim 1, wherein the two sheets of glass are of different composition and hue.

14. The glazing according to claim 1, wherein the glazing is a motor vehicle glazing.

15. A vehicle comprising the glazing of claim 1.

16. The vehicle according to claim 15, wherein the glazing is mounted in a frameless door.

17. The glazing according to claim 1, wherein a minimum sound transmission loss (STL) in a frequency range from 2000 to 5000 Hz is at most 3 dB lower than a minimum STL of a symmetric laminated glazing having an equal total glass thickness and a same interlayer.

18. A method for manufacturing the glazing of claim 1, comprising:
   hot forming followed by thermal reinforcement by blowing air for the two sheets of glass, then,
   assembling the two sheets of glass into the laminated glazing, one sheet of the polymer material being placed between the two sheets of glass and adhering to them to form the interlayer.

19. The method according to claim 18, wherein the hot forming gives the two sheets of glass identical shapes.

20. The method according to claim 18, wherein the hot forming is carried out on each sheet in the individual state, a same type of forming process being used for forming the two sheets of glass.

21. The method according to claim 20, wherein the hot forming is carried out over two separate production runs for each of the sheets of glass.

* * * * *